United States Patent [19]

Palmer

[11] Patent Number: 4,478,268

[45] Date of Patent: Oct. 23, 1984

[54] DOOR STRUCTURE

[75] Inventor: Glenn R. Palmer, Copper Cliff, Canada

[73] Assignee: Copper Cliff Door Manufacturing (1980) Limited, Barrie, Canada

[21] Appl. No.: 481,277

[22] Filed: Apr. 1, 1983

Related U.S. Application Data

[63] Continuation of Ser. No. 220,719, Dec. 29, 1980, abandoned.

[51] Int. Cl.³ .............................................. E06B 9/20
[52] U.S. Cl. .................................... 160/310; 160/272
[58] Field of Search ...................... 160/113, 270–273, 160/243, 310, 368 R, DIG. 8; 49/141

[56] References Cited

U.S. PATENT DOCUMENTS

| 537,642 | 4/1895 | Johnston . | |
|---|---|---|---|
| 608,436 | 8/1898 | Bowman . | |
| 608,506 | 8/1898 | Bowman . | |
| 2,641,031 | 6/1953 | Ehnet | 49/141 |
| 2,839,135 | 6/1958 | Anderson | 160/133 |
| 3,331,425 | 7/1967 | Graves . | |
| 3,460,602 | 8/1969 | Hugus | 160/310 |
| 3,690,602 | 9/1972 | Johnson | 160/DIG. 8 |
| 3,848,653 | 11/1972 | Youngs | 160/310 |
| 3,878,879 | 4/1975 | Manns . | |
| 4,126,174 | 11/1978 | Manianetz et al. | 160/271 |

FOREIGN PATENT DOCUMENTS

| 801986 | 12/1968 | Canada . |
| 978079 | 11/1975 | Canada . |
| 6476194 | 9/1975 | Fed. Rep. of Germany . |
| 7528175 | 1/1976 | Fed. Rep. of Germany . |
| 2623323 | 12/1977 | Fed. Rep. of Germany . |
| 7717554 | 9/1978 | Fed. Rep. of Germany . |
| 7832604 | 2/1979 | Fed. Rep. of Germany . |
| 118383 | 2/1958 | New Zealand . |
| 130167 | 8/1963 | New Zealand . |
| 157764 | 2/1971 | New Zealand . |

*Primary Examiner*—Peter M. Caun
*Attorney, Agent, or Firm*—Wegner & Bretschneider

[57] ABSTRACT

A door for closing vehicular traffic passages is provided in which the door is a curtain fabricated from a hard flexible material. The curtain runs in opposing channels, is mounted on a counterbalanced wind-up drum and under impact changes weight, moves out of the channels and is wound up to open the vehicular passage.

14 Claims, 20 Drawing Figures

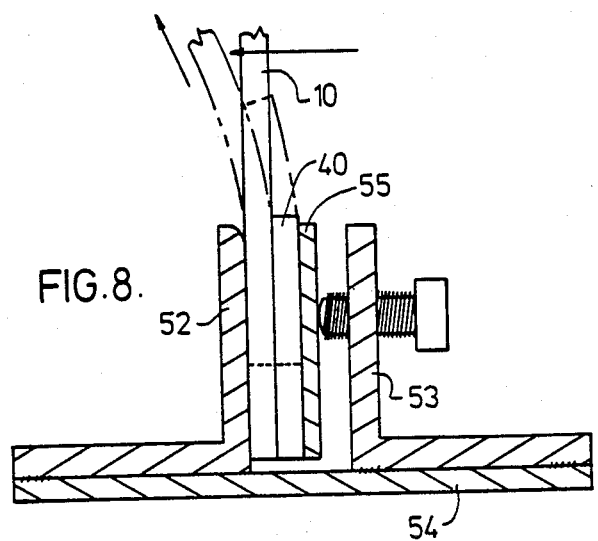
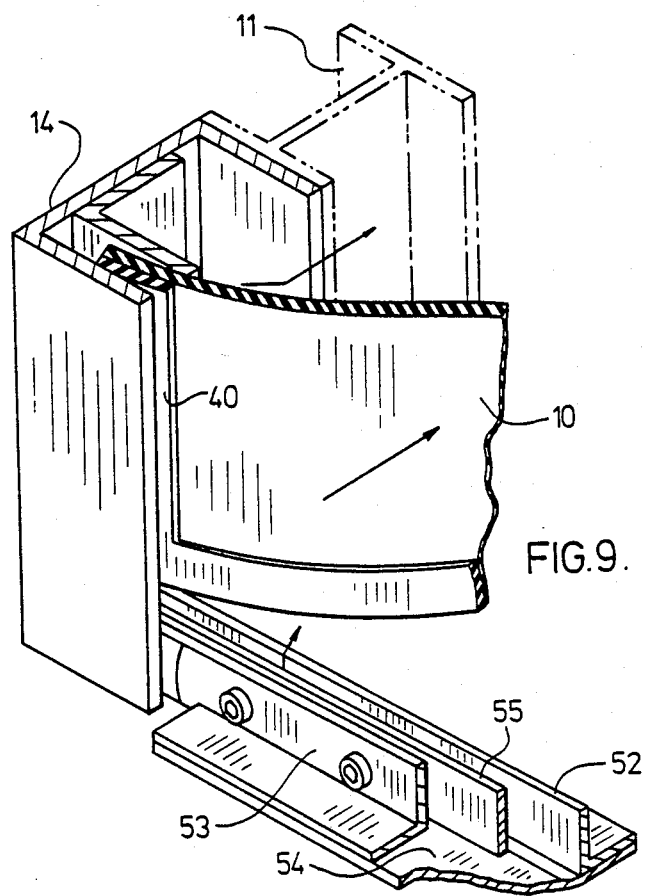

DOOR STRUCTURE

This is a continuation of Ser. No. 220,719 filed Dec. 29, 1980, now abandoned.

BACKGROUND OF THE INVENTION

This invention relates to doors and more particularly to overhead doors which are employed in industrial applications.

In situations where doors have to be maintained closed and opened periodically to permit the passage of vehicle traffic the damage to doors has been frequent and extensive and their maintenance and replacement has been expensive. The direct replacement cost alone is enormous and the consequential costs may even be greater. For example in mining applications where sections of a mine are required to be kept at predetermined pressure if a door is damaged such that pressure cannot be maintained then the mine section will be closed.

Present experience indicates that the direct cost of door replacement may involve hundreds of thousands of dollars annually in any one mining application.

Many attempts have been made to reduce these costs. Remote automatic controls for the door opening and closing operation have been provided through various types of remote sensing. Driver controlled operation has also been provided.

However, while these systems have improved damage control they have not proved to be satisfactory. With remote controls the variable speed of traffic approaching a door is a limiting factor. It is also a factor in driver control. In both cases the response time of the doors is critical and if the driver approaches a door at a higher speed than that permitted by the system response time damage follows.

Too slow an approach leads to a loss of operating efficiency.

The other principal factors in driver control of the door operating functions is the driver's own awareness of the door presence and his response time. Frequently in dark situations the driver is just not aware of his approaching a closed door and damage results.

The other factor is damage to the vehicle. This is also considerably expensive and leads to downtime.

SUMMARY OF THE INVENTION

With these problems and difficulties in mind, the principal object of the present invention is to provide a damage-minimizing door which may be used to close vehicular traffic passages. This invention will be easily and economically repaired and maintained. It will lead to more efficient use of the traffic passage and minimize damage to the vehicle.

There is provided in accordance with the present invention a damage-minimizing door which comprises: in combination, a pair of spaced-apart guide means; a flexible curtain having a pair of side edges movably engageable with each of said guide means and movable out of engagement therewith under a predetermined minimum impact force; and means for moving said curtain between a first door-opening open position and a second door-opening closed position.

No door is completely damage-proof but the present structure has demonstrably reduced damage to both the vehicle and door; is easily installed and maintained; and may be used in applications of high pressure.

DESCRIPTION OF THE DRAWINGS

These and other features will be more clearly understood from the following description and drawings in which specific embodiments are described by way of example and in which

FIG. 8 is a schematic enlarged end elevation of the bottom of one curtain structure of the type shown in FIG. 6 and serves to illustrate the disconnection under impact between a base bar and a curtain door;

FIG. 9 is an enlarged fragmentary perspective view of a curtain, base bar and serves to illustrate their respective disconnection under impact.

THE STRUCTURE

Figure 1:
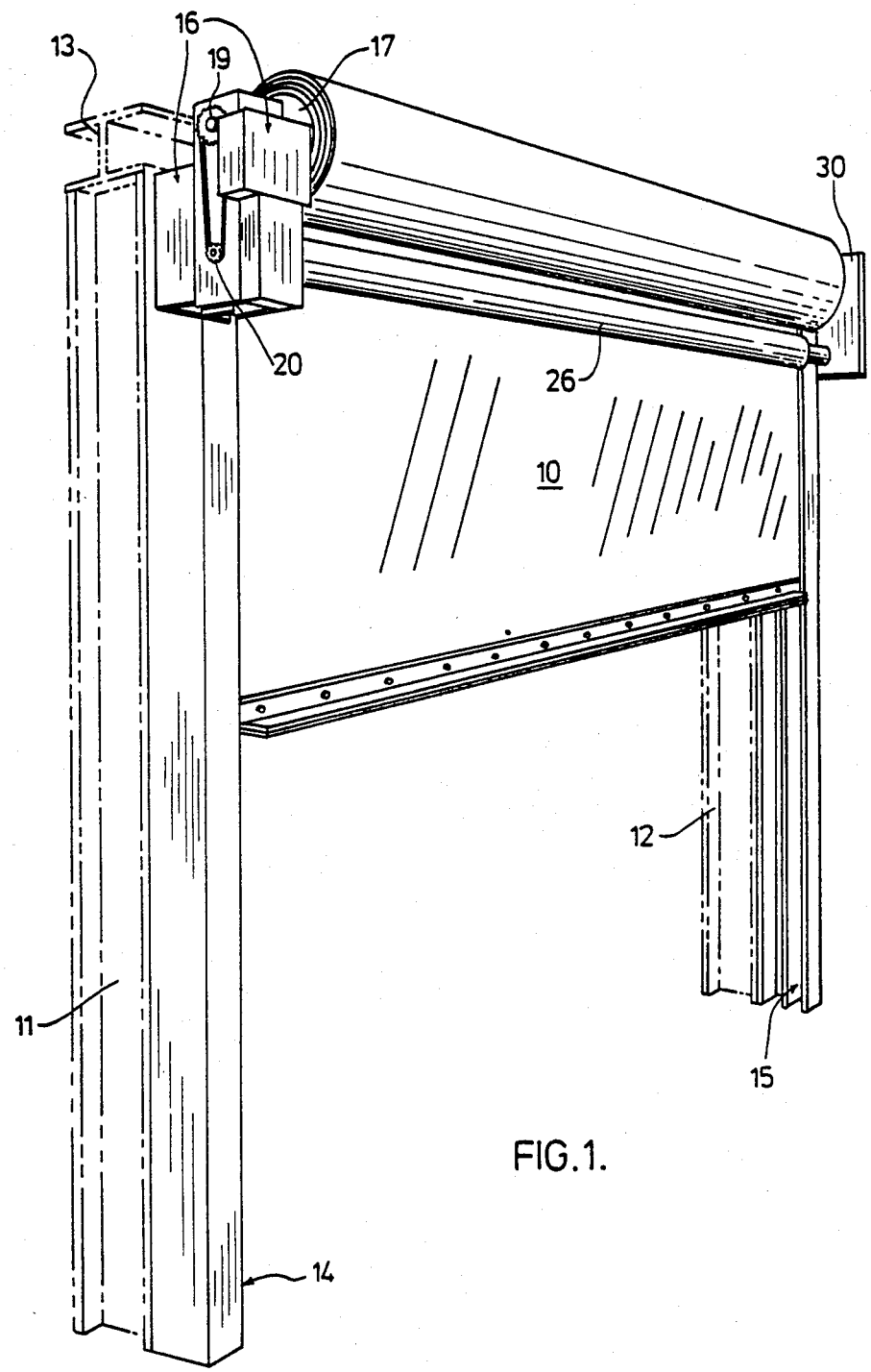
FIG. 1 is a general perspective view of one embodiment of a door structure in accordance with the present invention with the door curtain in a partially lowered position and the door bulk-head shown in dotted outline.
Figure 2:
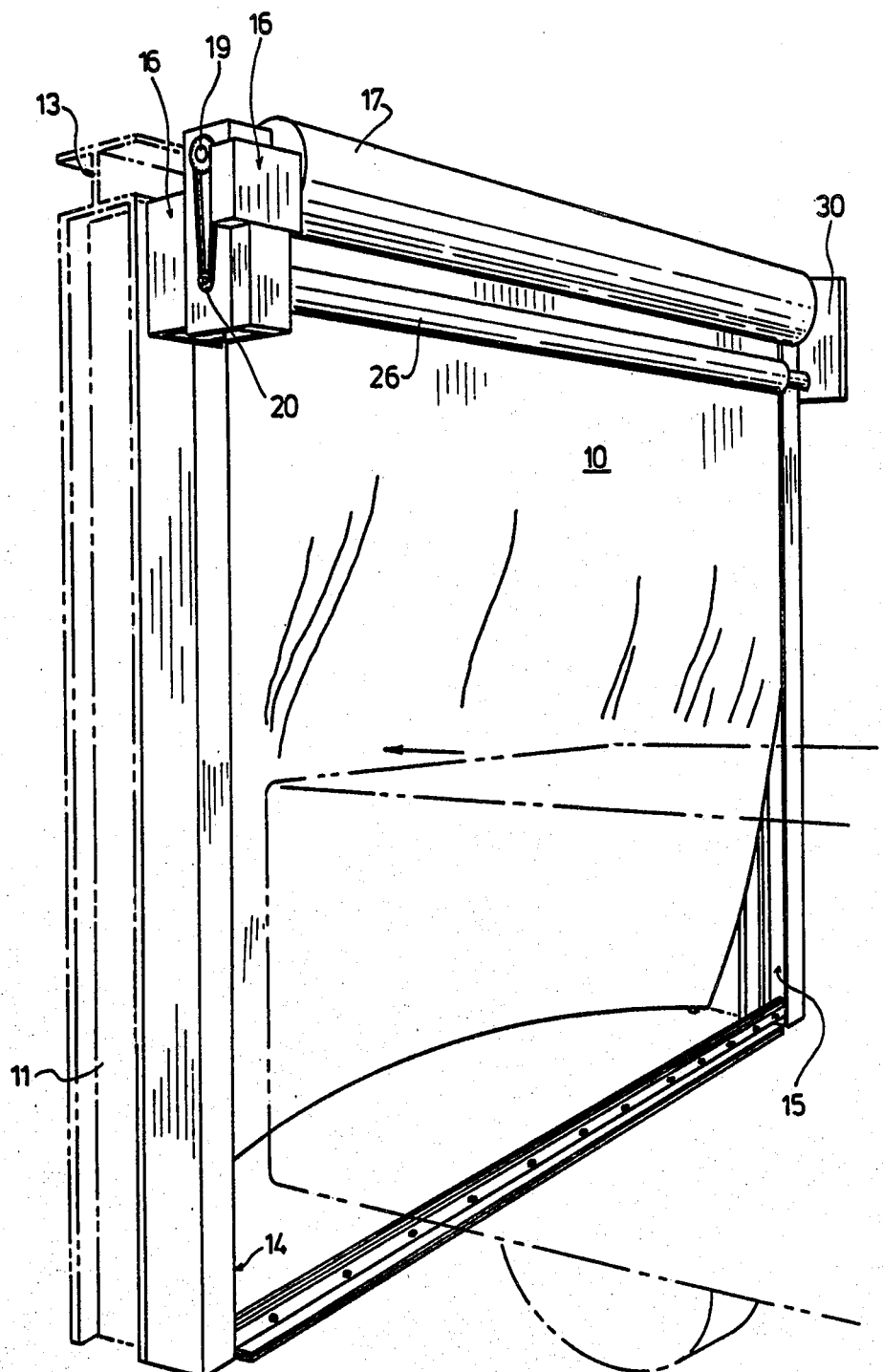
FIG. 2 is a general perspective view of the door illustrated in FIG. 1 in the door-closed position and under impact from a vehicle shown in dotted outline and serves to illustrate the general concept of the invention.
Figure 3:
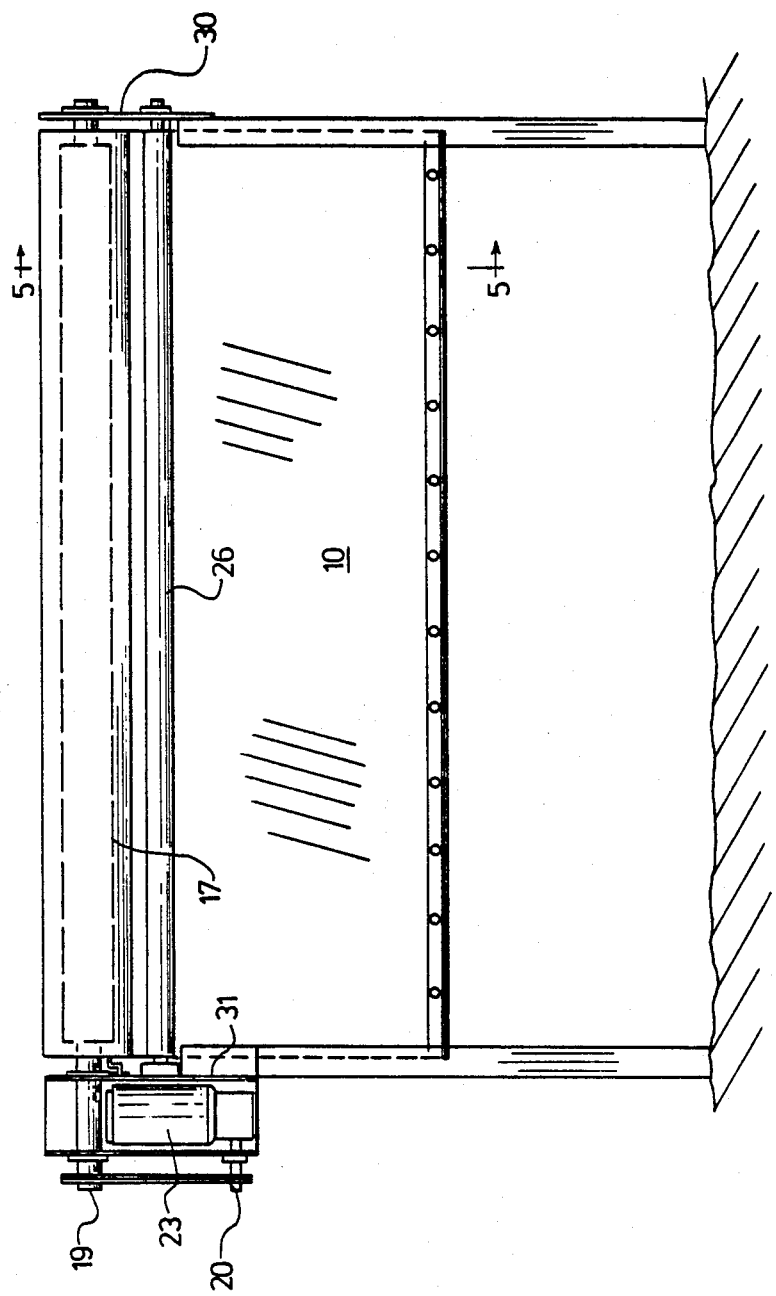
FIG. 3 is a front elevation of the door structure illustrated in FIG. 1.

Referring to the drawings and more particularly to FIG. 1 it will be noticed that the door structure itself is indicated at 10 and comprises a curtain of flexible material.

In the embodiments illustrated the curtains are manufactured of rubber. In the sense in which the term "rubber" is employed in this specification it should be understood that it includes any suitable flexible materials which have resilient capabilities or the capacity to retain their form.

It will also be understood that where fire is a potential hazard that suitable non-toxic rubbers or equivalent materials would be employed. Such rubbers are identified as Type 1—Wingprene (neoprene) and Type 11—SBR.

With structures of the present invention, depending on the particular application it may be necessary to provide bulkheads. Such bulkhead is illustrated in FIG. 1 and comprises vertical steel members 11 and 12 and a cross piece 13.

To each vertical member an inwardly facing guide channel such as 14 and 15 is secured in aligned opposite relationships. At the top and on the outerside of the vertical 14 away from the traffic flow an assembly 16 comprising a motor 23 and clutch 23 is mounted. The motor may be operated in any conventional manner by remote or manual controls; the choice depends upon the application.

Figure 5:
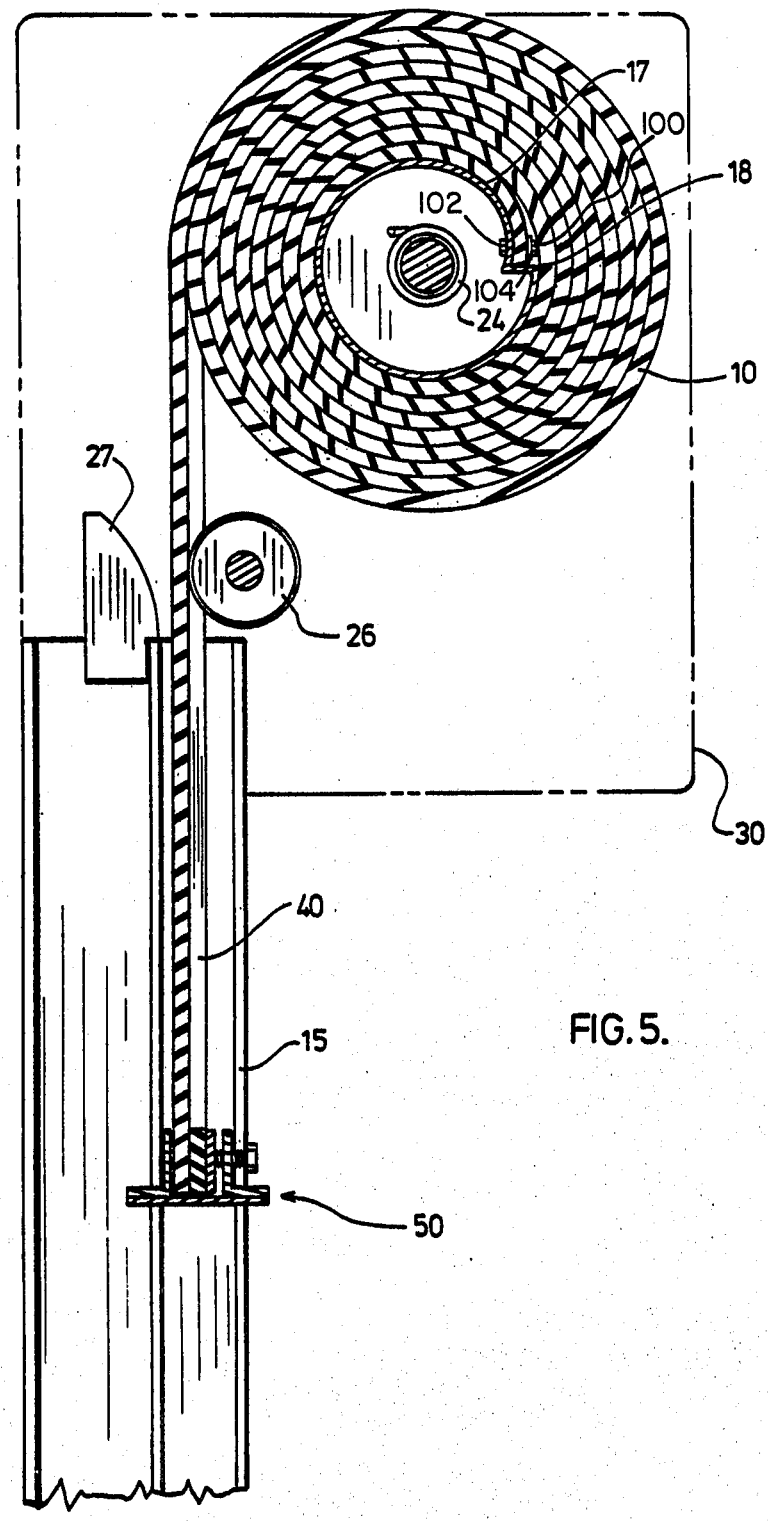
FIG. 5 is schematic end elevation partially in section taken along line 5-5 of FIG. 3 and serves to show the relationship between a door curtain and its components and the guides therefor with the door curtain in an almost completely open position.
Figure 6:
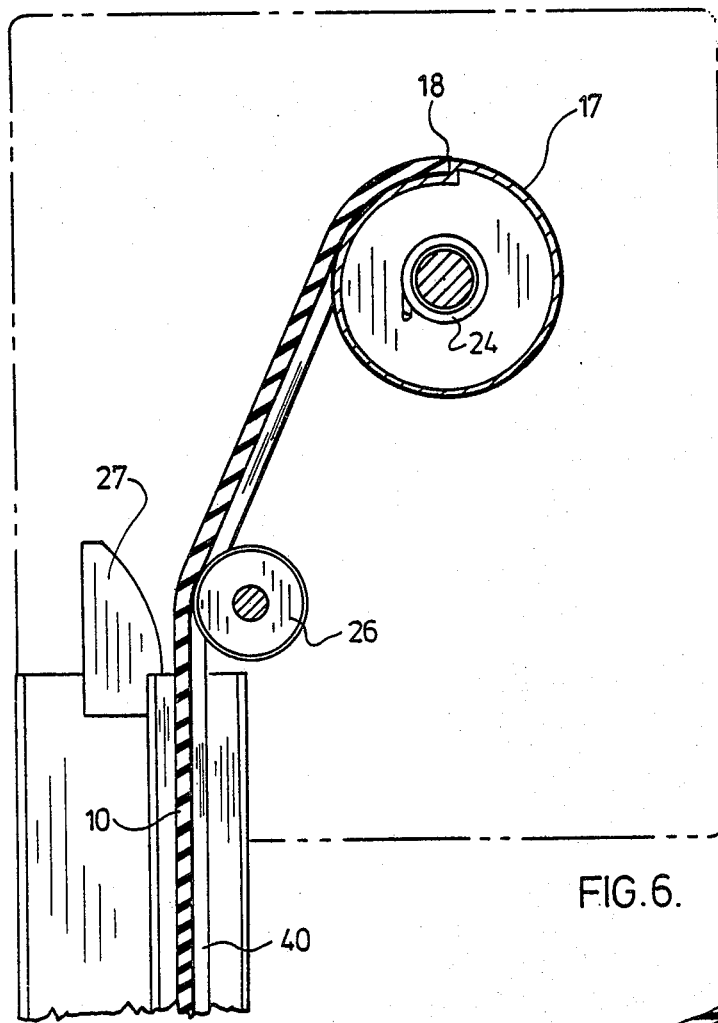
FIG. 6 is a further schematic fragmentary end elevation of a door curtain illustrated in FIG. 4 in a lowered position.

Curtain 10 is secured along its top edge to a drum 17 as illustrated in FIG. 5. This securement may be as illustrated by a series of openings such as 100 provided adjacent the upper end of the curtain 10 with parallel bars 101 and 102 on either side of curtain 10. Securement is accomplished by bolts and nuts such as 103 and 104. Drum 17 is rotatably supported in mounting brackets 30 & 31, is stepped as at 18 to ensure uniform winding and unwinding of the curtain sheet 10 and is connected through a shaft 19 chain drive 20, clutch 21, and a worm and screw 22 to a motor 23.

Figure 4:
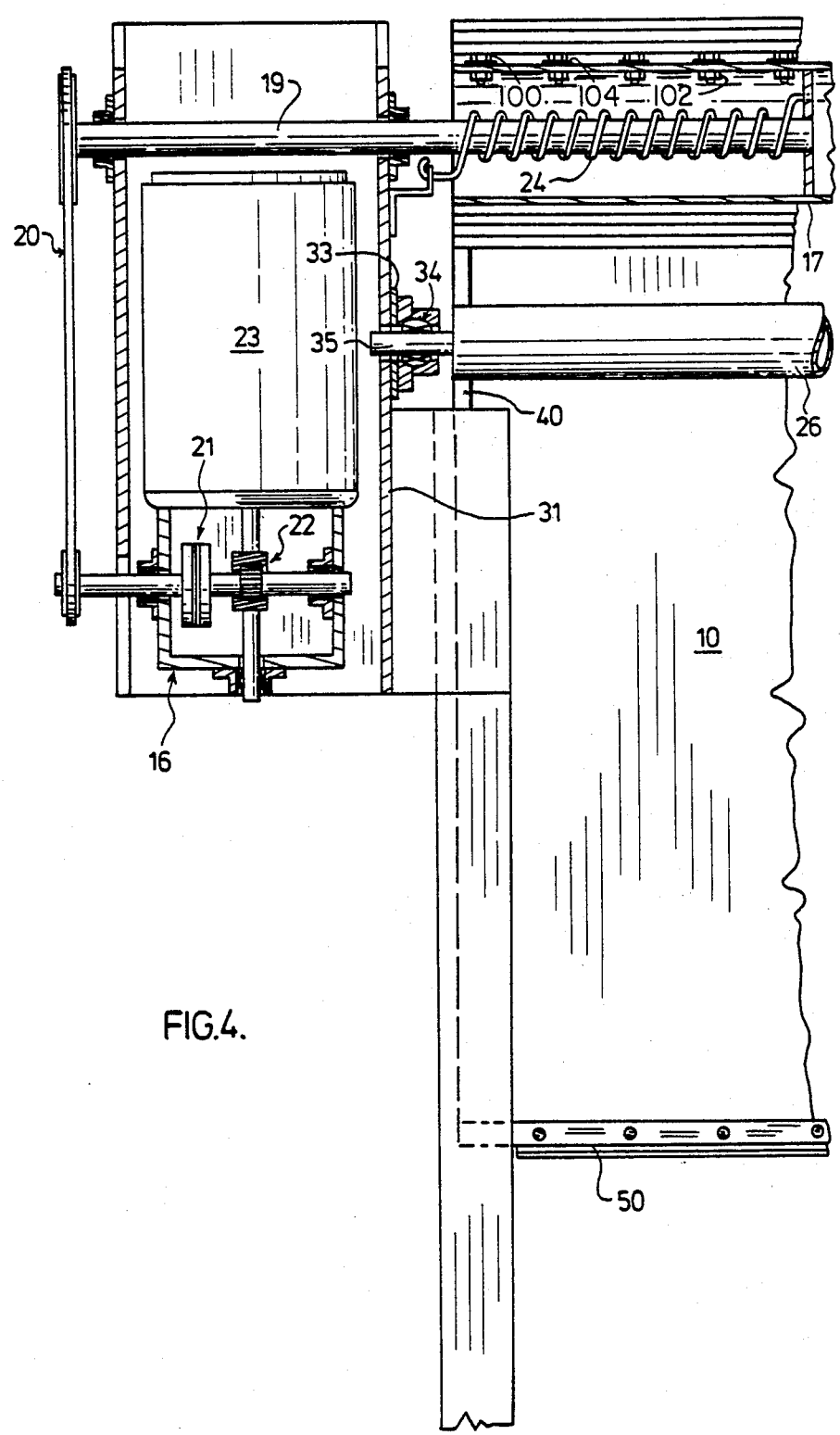
FIG. 4 is an enlarged fragmentary front elevation partially in section of the right hand side of the door structure illustrated in FIG. 3.

Drum 17 is provided at each end with torsion springs such as 24 as illustrated in FIG. 4. These torsion springs serve to wind up the curtain 10.

As shown in particularly FIGS. 4, 5, 10 and 11 a guide roller 26 is also rotatably mounted in brackets 30 and 31. Roller 216 is mounted forward and below of the axis substantially tangential to the channels 14 and 15 and defines one side of a throat to guide curtain 10.

The remaining side of the throat is defined by a bracket or bar 27 which presents a downward curved surface toward the adjacent channel mouth.

Figure 17:
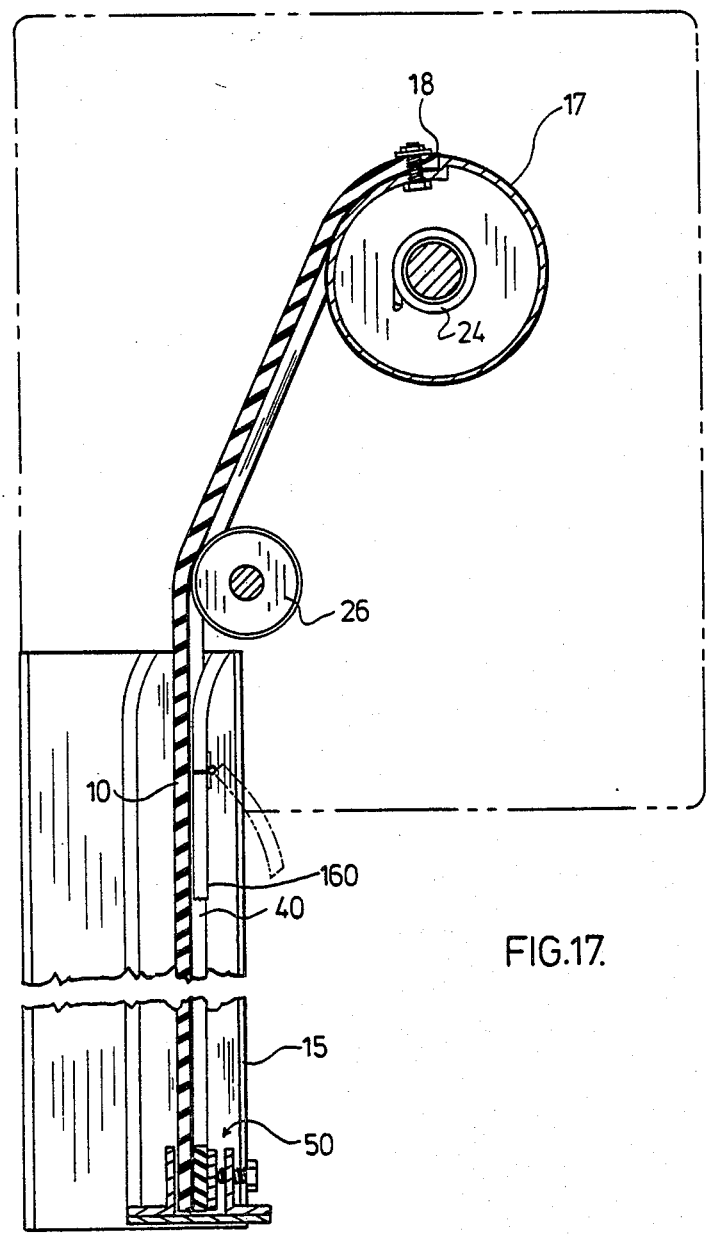
FIG. 17 is a schematic fragmentary end elevation of an alternate door structure in a lowered position.

In FIG. 17 an alternate structure is illustrated. As shown in this drawing the channel 15 is provided with curved upper ends which curve towards the idler roller 26. The inner wall 160 of guide channel 15 is also lockably hinged at 161 so that it may be folded down when the curtain 10 has to be reinserted in the channel.

Roller 26 is supported at the motor side at least by a plate 33 which may be adjustably secured horizontally and vertically to the housing plate 31. Plate 33 in turn supports a universal bearing 34 which supports a roller shaft 35.

This arrangement facilitates adjustment in mounting the guide roller 26 in installation and maintenance. The correct guidance of the rollers and consequently the curtain is important if the curtain is of rubber since there is a tendency for rubber to bind against metal and this will prevent free-running of the curtain.

It is also to be noted that the guide roll 26 is mounted on that side of the curtain which is presented in those applications where there is a pressure differential across the curtain, to the lower pressure side. Under such conditions the curtain 10 has a tendency to bow to the negative pressure side and it is necessary to maintain contact with the curtain to ensure that it runs properly and keeps in the channels.

Figure 15:
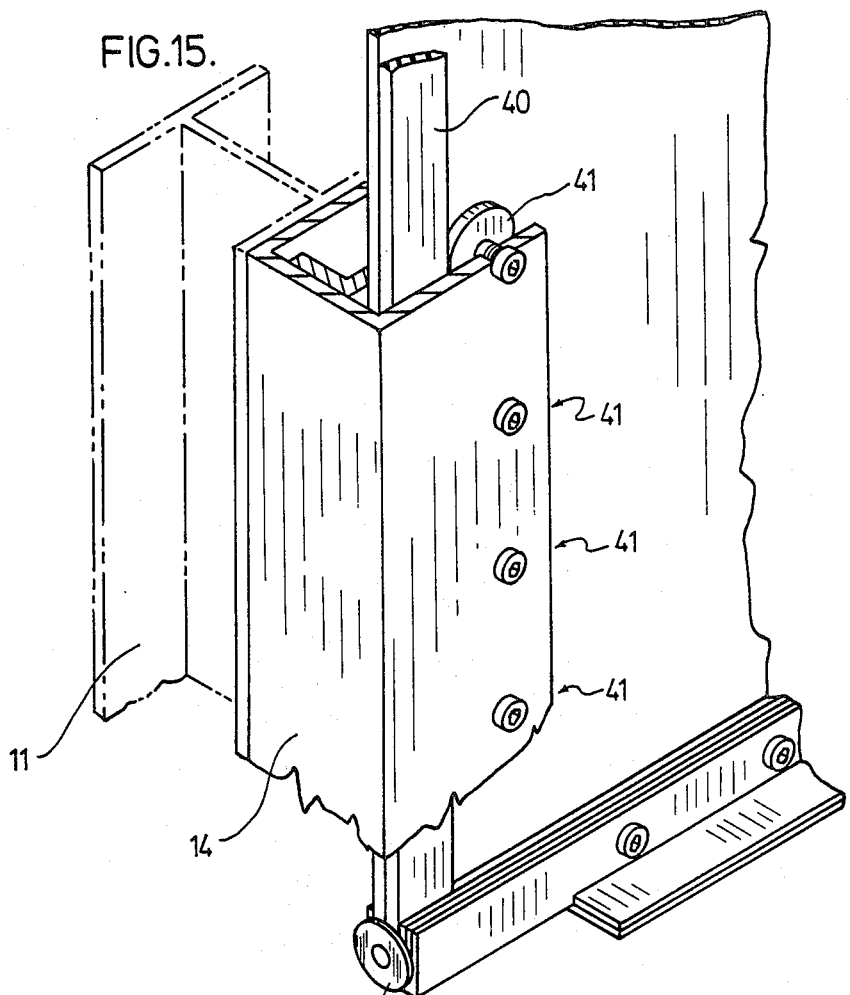
FIG. 15 is an enlarged fragmentary view of an alternate door curtain construction and illustrates its relationship with the curtain guides.
Figure 16:
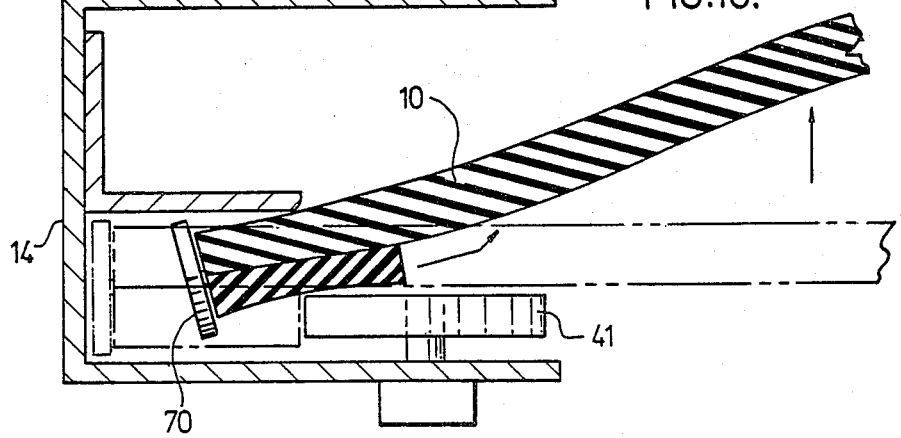
FIG. 16 is an enlarged schematic plan view of the structure illustrated in FIG. 15 and serves to illustrate through dotted outline the relationship of the various components under impact.

The curtain itself is preferably of a hard flexible rubber composition. On the outside vertical edges a further strip of rubber, 40, as shown in FIGS. 9, 15 and 16 may be provided. Or the curtain may be of thicker construction at the edge. This assists in sealing, particularly in applications where higher pressure may be required. In this context high-pressure is meant to include all pressures within the range 15 lbs./sq.ft. (atmospheric) to 45 lbs./sq.ft. (2.5 Waters GA). Strip 40 while assisting sealing does not increase the weight of the curtain 10 appreciably. However, as seen in FIG. 15 where lateral guide rollers such as 41 are mounted on the channels it serves as a convenient engagement area.

It will also be noted that in the embodiment of FIG. 15 a further roller 70 is mounted on each end of base bar 50 to engage the forward and rear walls of the channels 14 and 15 and provide further guidance to the curtain 10.

These rollers being within the channels 14 and 15 will not be exposed to too much damage.

Figure 7:
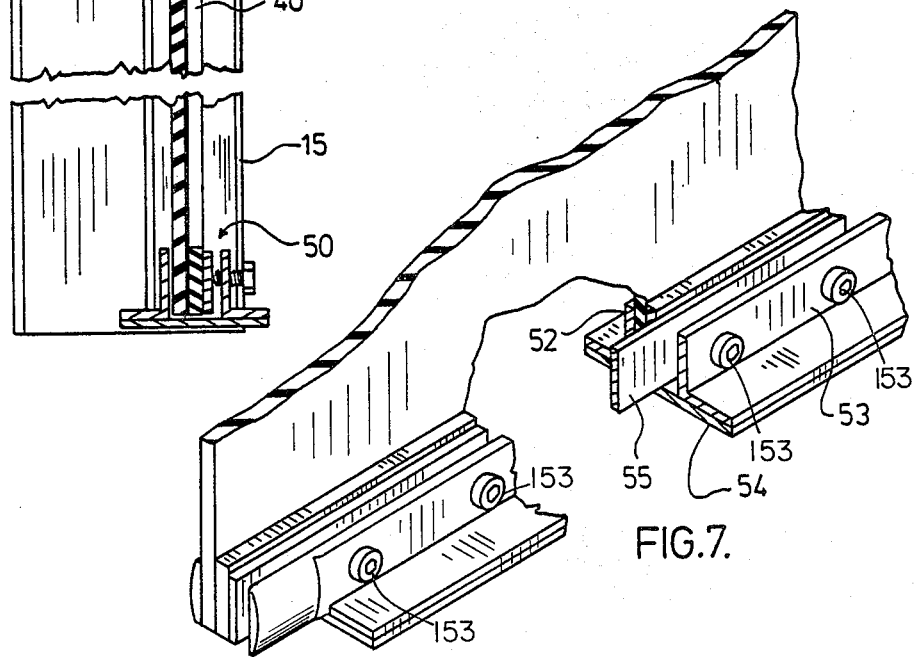
FIG. 7 is an enlarged fragmentary perspective view of the lower end of the embodiment of a door curtain illustrated in the previous drawings and serves to illustrate the structural relationship between a base bar and a curtain.
Figure 10:
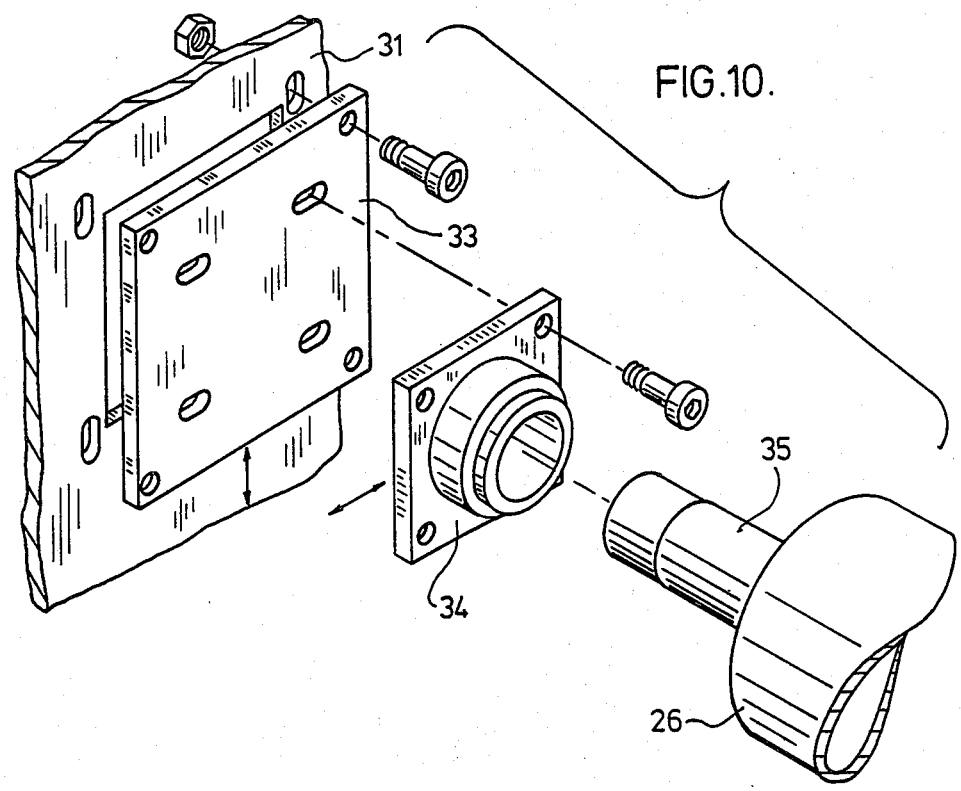
FIG. 10 is an enlarged exploded view of a guide roller mounting in accordance with the present invention
Figure 11:
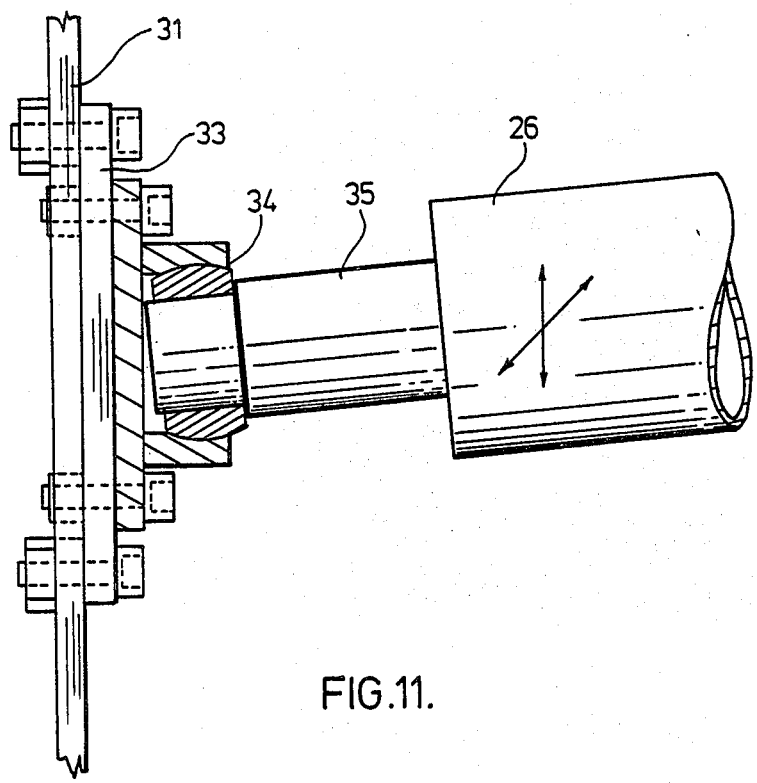
FIG. 11 is an enlarged front elevation, partially in section, of a guide roller mounting in accordance with the present invention.

Base bar 50 comprises a pair of spaced apart angles 52 and 53 which are connected by a flat bar 54. Bar 53 is provided with a series of threaded bolts which pass through and engage a securing strip 55. It is to be noticed, from FIG. 7, that where the securing strip basses between the walls of the channels 14 and 15 the strip is rounded to ease any friction. This base bar serves to stiffen the lower end of the curtain.

The lower edge of curtain 10 is passed between angle 52 and strip 55 and the bolts are tightened so that the engagement between the bar and the curtain is tight but releasable. The amount of force required to release the bar may be adjusted according to the pressure.

Figure 12:
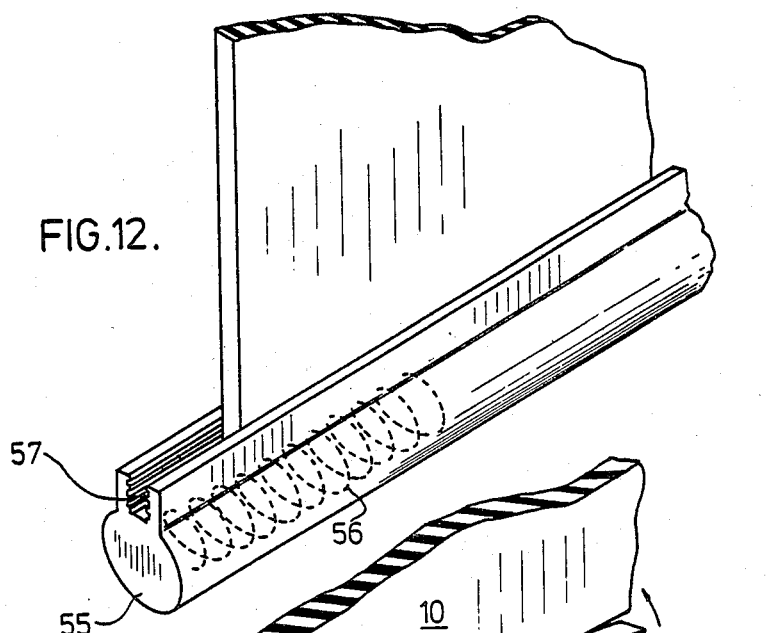
FIG. 12 is an enlarged perspective view of the bottom of an alternate embodiment of a door curtain in accordance with the present invention.
Figure 13:
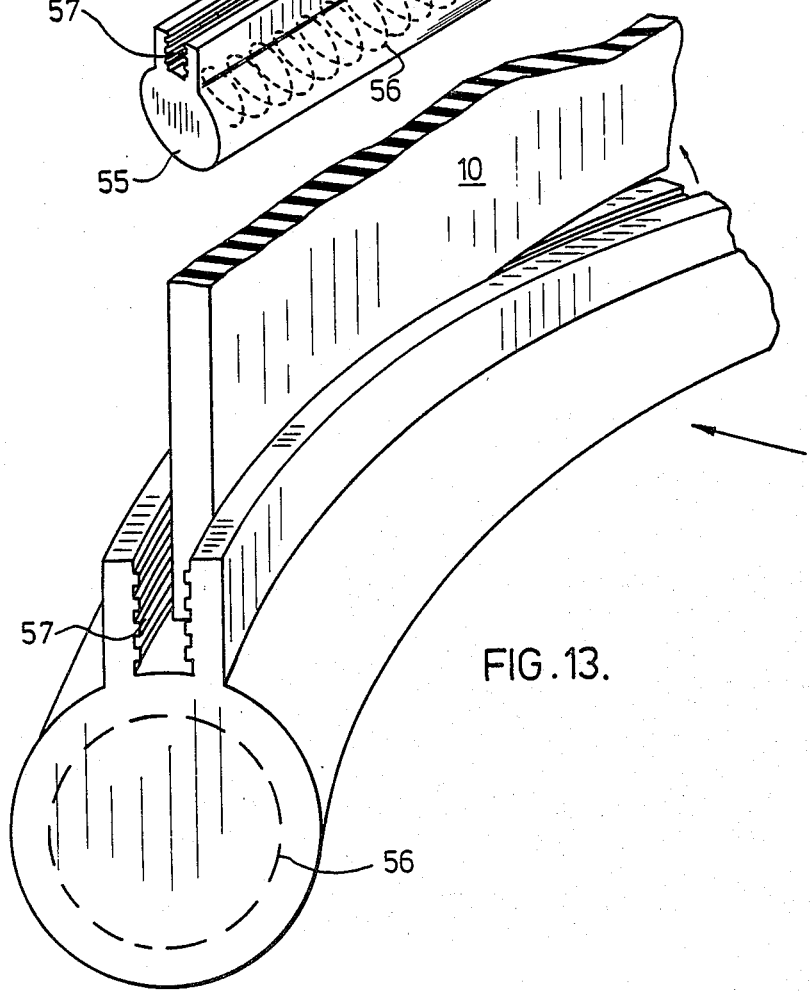
FIG. 13 is an enlarged schematic view of the door curtain illustrated in FIG. 12 showing the action between curtain components under impact.
Figure 14:
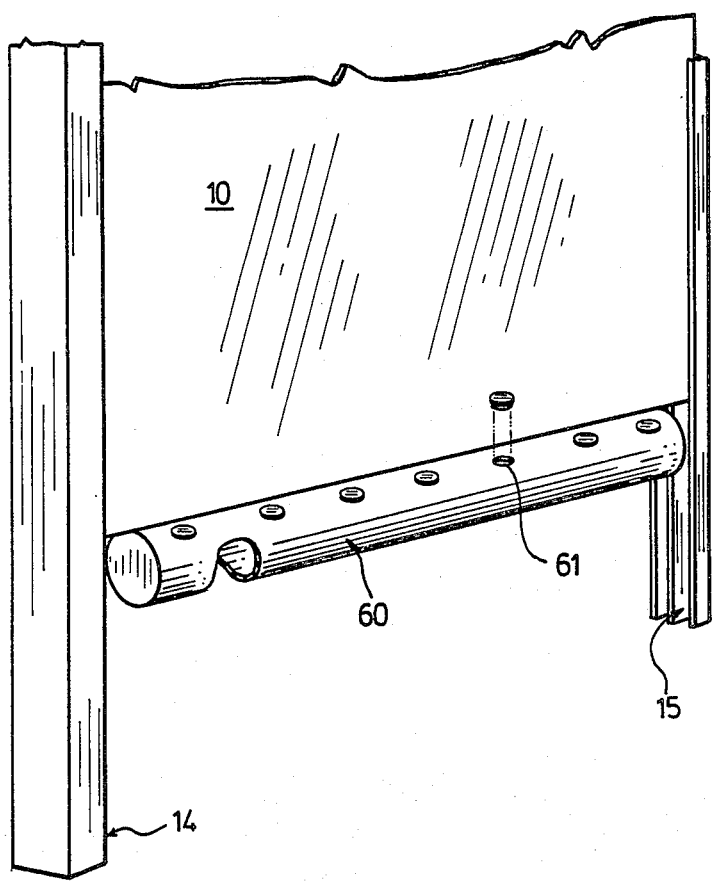
FIG. 14 is an enlarged schematic view of the bottom of a curtain of a further alternate embodiment of a curtain in accordance with the present invention.

In the structures illustrated in FIGS. 12, 13 and 14 two alternative structures are provided.

In the structure of FIGS. 12 and 13 a rubber tube 55 with an interior coiled spring 56 is substituted for the base bar and this structure is connected by a grooved channel 57 to the lower edge of curtain 10.

In the structure of FIG. 14 a hollow rubber tube 60, closed at both ends is secured, either permanently or removably to the lower edge of curtain 10. This tube has a series of holes 61 on the upper surface.

The internal chamber of the tube 10 may then be filled with a suitable fluid which may be added to or removed through the holes 61.

Figure 18:
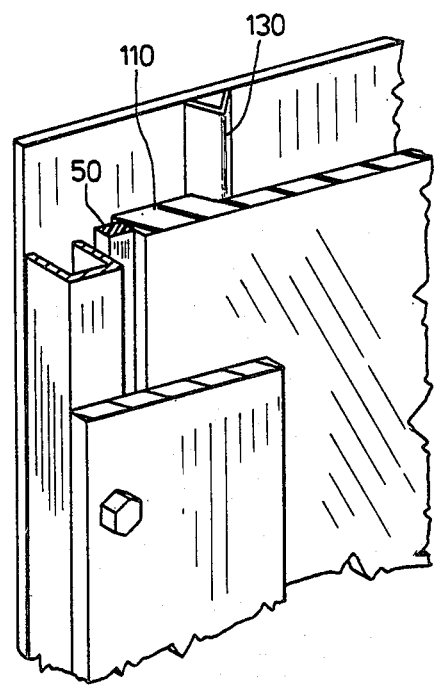
FIG. 18 is a plan section of one side of an alternate curtain structure in accordance with the present invention.
Figure 19:
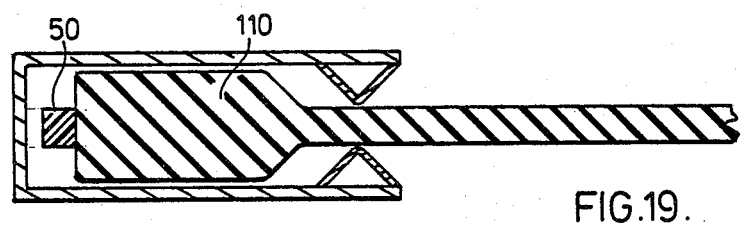
FIGS. 19 and 20 are further plan sections of one side of the lower end of alternate curtain structures in accordance with the present invention.
Figure 20:
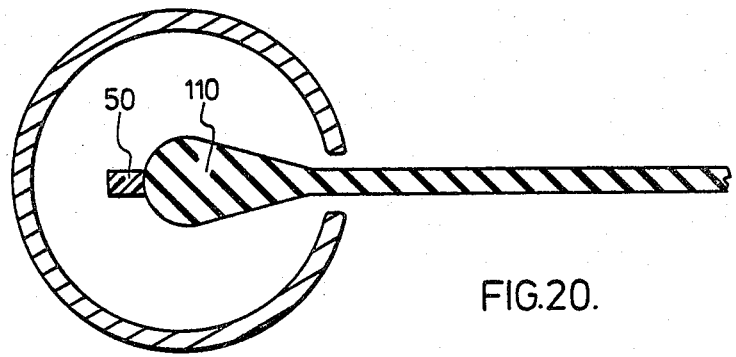
Figure 2:
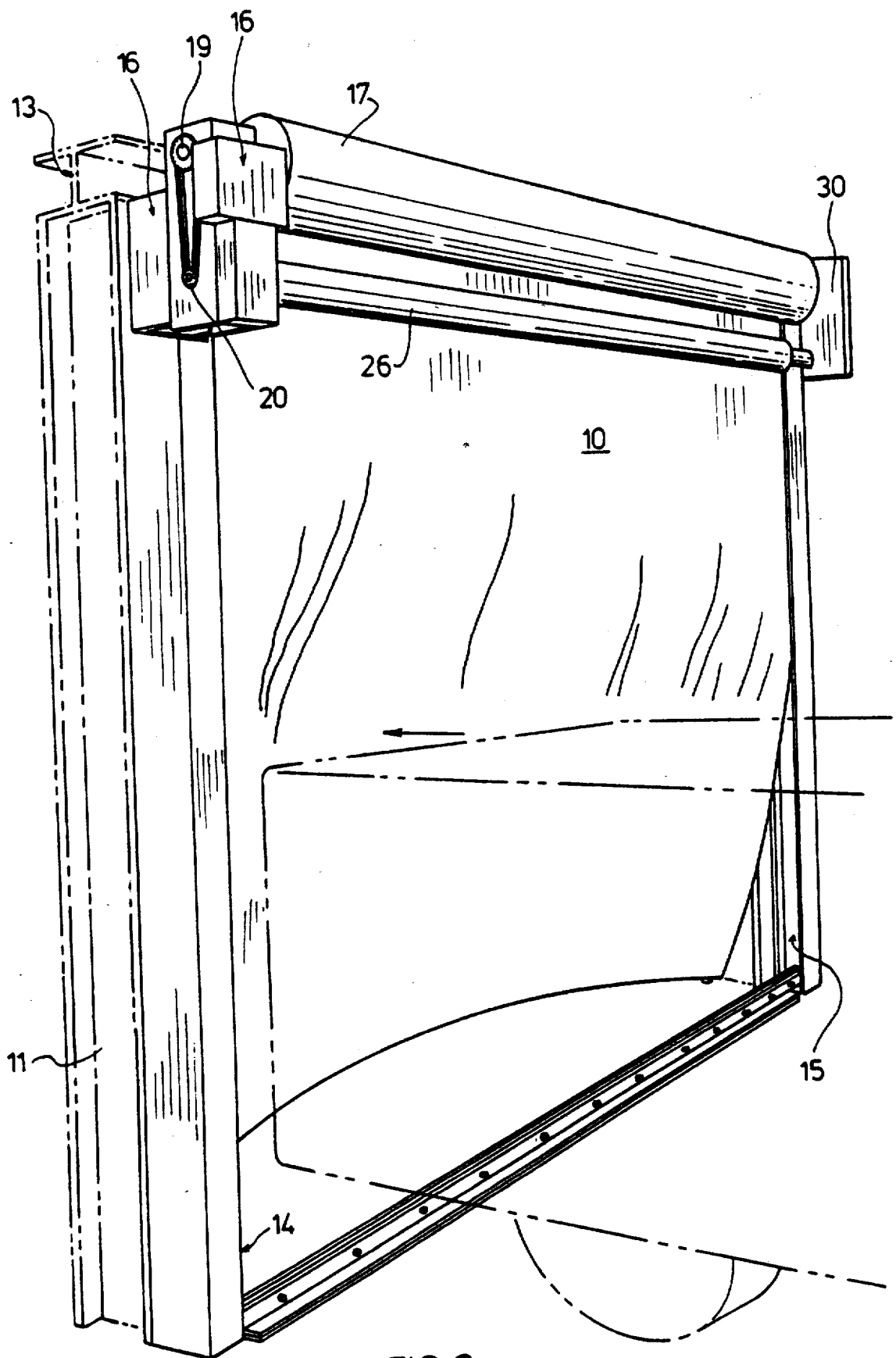

In the embodiments illustrated in FIGS. 18 through 20 various alternate curtain structures are illustrated. Corresponding components are correspondingly numbered in these figures to those of other figures. In each of these structures the curtain 10 is provided with a thickened area 110 which may have the alternate configurations illustrated in the respective figures. And in each structure the guide channel has a throat of reduced width for restraining movement of the curtain out of the channel. In FIG. 18, the channel is constricted by angle 130; in FIG. 19 by opposed angles 131 and 132 and in FIG. 20 by the configuration of the open tube structure of the channel itself.

In each of these structures the throat is narrower than the curtain edge. This precludes lateral movement of the curtain 10. It will of course be understood that the remote lateral side of the curtain and its corresponding guide channel are of the same structure.

It will of course be understood that flexible or compressible materials other than rubber may be employed.

In those applications where the passages of gases is not important permeable materials may be employed.

MODE OF OPERATION

The mode of operation of the present invention is extremely simple. It is assumed that the door 10 is down.

Essentially, if a driver fails to open the door 10 or if it fails to open before it is hit by a vehicle at impact, as illustrated in FIGS. 2, 8, 9, 13 and 16, the vertical edges of the curtain 10 will be pulled out of their guide channels 14 and 15 in the manner illustrated in the drawings and will retreat before the vehicle. In addition, the base bar 50 or tube 55 may release from the curtain. The vertical edges will be pulled out irrespective of the height of the door above the ground as long as it is within vehicle contact. Thus even if the door is halfway up or down the same action will hold. Clutch 21 is disconnected and slips so that shaft 19 is free to rotate. The accurate winding of the curtain is ensured by guide roller 26, guide bars 27 and the further fact that drum 17 is stepped to ensure circular winding motion.

Since the curtain is of rubber it will give with the force and unless it is hit with considerable speed, more than is normally permissible at least in mining applications it will be substantially undamaged.

It is generally a simple and straightforward operation to reinsert the curtain back into its guide channels and to make the door operational again.

With the embodiment illustrated in FIG. 17 the insertion of the curtain 10 into the guide channels is facilitated by the hinge. By folding down the upper ends of the channels as illustrated in dotted outline the curtain 10 may easily be fed into the channel.

With the embodiment illustrated in FIG. 14 the tube 60 may not be detachable and upon impact some of the fluid in the chamber will be discharged through the openings 61 so that the torsion balance is upset and the curtain is wound up.

It has been found as mentioned previously in experiments that these doors are capable of withstanding substantial pressures and that they can be subjected to all manner of abuse which other forms of solid doors have not been able to withstand.

It will be apparent that an extremely simple solution has been provided where many other forms have been tried without much success.

It will also be obvious that other forms may be given and modifications may be made to the embodiments disclosed in this present application without departing from the spirit essence of the invention.

The embodiments of the invention in which an exclusive property or privilege is claimed are defined as follows:

1. A damage-minimizing door comprising:
   a flexible curtain having an upper end and a lower end and side edges;
   a curtain winding mechanism;
   said upper end of said curtain being secured to said winding mechanism for moving said curtain upwards and downwards;
   a pair of parallel spaced apart guide channels, said side edges of said curtain being movable in said guide channels, being sealingly engageable therewith under at least atmospheric pressure and being releasable therefrom at a predetermined impact force on said curtain; and,
   a rigid bar secured adjacent the lower end of said curtain, said rigid bar being releasably secured to said curtain and releasing therefrom at said predetermined impact force.

2. A damage-minimizing door as claimed in claim 1 wherein said flexible curtain is of hard rubber.

3. A damage-minimizing door as claimed in claim 1 wherein said curtain winding mechanism includes a winding drum, motor means for actuating said winding drum, and a pair of torsion springs provided at the ends of said drum.

4. A damage-minimizing door as claimed in claim 1 wherein said flexible curtain includes sealing means extending along said side edges of said curtain.

5. A damage-minimizing door as claimed in claim 1 wherein said bar is pressurably secured to said curtain.

6. A damage-minimizing door as claimed in claim 1 wherein said flexible curtain is compressible and includes a thicker area along each edge thereof engageable with said guide channels; said guide channels including means for restraining movement of said curtain laterally out of said guide channels.

7. A damage-minimizing door as claimed in claim 6 wherein said restraining means comprises roller means engageable with an inner side surface of said thickened areas.

8. A damage-minimizing door as claimed in claim: 6 wherein said restraining means includes projections extending into a channel defined by said guide channels to provide a throat of reduced dimension relative to said thickened area of said curtain to restrain lateral movement of said curtain.

9. A door as claimed in claim 1 wherein said guide channels each include an upper portion movable from a closed channel position to an open channel position to provide access to said guide channels.

10. A damage-minimizing door including:
    a flexible curtain having a first upper end, a second lower end and side edges;
    a curtain winding mechanism, said first end of said curtain being secured to said curtain winding mechanism for moving said curtain upwards and downwards to respectively open and close a doorway;
    a pair of parallel and spaced apart guide channel means each comprising an elongate slot whose mouth faces into said doorway, said side edges being movable upwardly and downwardly in said slot as said curtain is respectively moved up and down;
    said side edges sealingly engaging said channel means when said door is employed in an environment which is at least at atmospheric pressure to normally restrain lateral movement of said side edges through the slot mouth from said guide channel means; and,
    said side edges of said flexible curtain being pulled laterally through the slot mouth from said guide channel means when a predetermined impact force is applied to said flexible curtain, causing at the most, negligible damage to said guide channel means and minimal damage to said flexible curtain.

11. A damage-minimizing door as claimed in claim 10 wherein said curtain incudes a compressible thicker area along each edge thereof engageable with said guide channels; said guide channels including, adjacent said slot mouth, restraining means for restraining movement of said curtain laterally out of said guide channel means.

12. A damage-minimizing door as claimed in claim 11 wherein said restraining means includes projections extending into said channel means to define a throat of reduced dimension relative to said thickened area of said curtain to restrain lateral movement of said curtain.

13. A damage-minimizing door as claimed in claim 11 wherein said guide channel means each include an upper portion movable from a closed channel position to an open channel position to provide access to said guide channel means.

14. A damage minimizing door as claimed in claim 11 further including a rigid bar releasably attached to the second lower end of said curtain and releasing therefrom at said predetermined impact force.

* * * * *

REEXAMINATION CERTIFICATE (1452nd)
United States Patent [19]
Palmer

[11] B1 4,478,268

[45] Certificate Issued Apr. 23, 1991

[54] DOOR STRUCTURE

[75] Inventor: Glenn R. Palmer, Toronto, Canada

[73] Assignee: M & I Door Systems Limited

Reexamination Request:
No. 90/002,028, May 17, 1990

Reexamination Certificate for:
Patent No.: 4,478,268
Issued: Oct. 23, 1984
Appl. No.: 481,277
Filed: Apr. 1, 1983

Related U.S. Application Data

[63] Continuation of Ser. No. 220719, Dec. 29, 1980, abandoned.

[51] Int. Cl.$^5$ .............................................. E06B 9/58
[52] U.S. Cl. .................................... 160/310; 160/272
[58] Field of Search .................. 160/113, 270, 273.1, 160/243, 310, 368.1, 194, 195, 23.1, DIG. 8, DIG. 11; 49/141

[56] References Cited

U.S. PATENT DOCUMENTS

| | | |
|---|---|---|
| 626,475 | 6/1899 | Andrews et al. |
| 1,198,456 | 9/1916 | Knapp ............... 160/273.1 |
| 1,294,879 | 2/1919 | Davis |
| 1,665,775 | 4/1928 | Dixson ............... 160/273.1 |
| 1,680,092 | 8/1928 | Dixson |
| 1,726,887 | 9/1929 | Clamp |
| 1,779,646 | 10/1930 | Traut |
| 1,810,848 | 6/1931 | Nye |
| 1,843,731 | 2/1932 | Petro ............... 160/23.1 |
| 2,041,105 | 5/1936 | Hart |
| 2,041,258 | 5/1936 | Mitchell |
| 2,104,648 | 1/1938 | Hickey |
| 2,107,929 | 2/1938 | Benson |
| 2,122,532 | 7/1938 | Mims et al. |
| 2,250,604 | 7/1941 | Poorman et al. |
| 2,349,226 | 5/1944 | Thomas ............... 160/273.1 |
| 2,350,288 | 5/1944 | Michelman ............... 160/195 X |
| 2,361,762 | 10/1944 | Glenn et al. |
| 2,621,725 | 12/1952 | Shacikoski |
| 2,783,833 | 3/1957 | Cann |
| 2,839,791 | 6/1958 | Lee |
| 3,149,665 | 9/1964 | Handford |
| 3,165,165 | 1/1965 | Chapman |
| 3,848,653 | 11/1974 | Youngs ............... 160/310 X |
| 3,855,733 | 12/1974 | Miller |
| 3,878,879 | 4/1975 | Manns |
| 3,960,216 | 6/1976 | Isobe |
| 4,016,920 | 4/1977 | Shepard ............... 160/194 X |
| 4,175,608 | 11/1979 | Alten |
| 4,273,974 | 1/1981 | Miller |
| 4,357,978 | 11/1982 | Keller et al. |

FOREIGN PATENT DOCUMENTS

| | | |
|---|---|---|
| 2811493 | 9/1979 | Fed. Rep. of Germany |
| 2260733 | 9/1975 | France |
| 2287926 | 5/1976 | France |
| 2313088 | 12/1976 | France |

OTHER PUBLICATIONS

Ambassador Catalogue (prior to 1982).
Balfour Rolling Doors Catalogue (prior to 1982).
Kinnear Rolling Doors & Grills Catalogue.
REMA Tip Top Rubber flyer.
Second price list with Ormsby Catalogue attached (Aug. 1973).
Svensk Byggkatalog (Nomafa) (1976).

*Primary Examiner*—David M. Purol

[57] ABSTRACT

A damage-minimizing door comprising:
- a flexible curtain having an upper end and a lower end and side edges;
- a curtain winding mechanism;
- said upper end of said curtain being secured to said winding mechanism for moving said curtain upwards and downwards;
- a pair of parallel spaced apart guide channels, said side edges of said curtain being movable in said guide channels, being sealingly engageable therewith under at least atmospheric pressure and being releasable therefrom at a predetermined impact force on said curtain; and,
- a rigid bar secured adjacent the lower end of said curtain, said rigid bar being releasably secured to said curtain and releasing therefrom at said predetermined impact force.

ID
REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, lines 48-52:

As shown in particularly FIGS. 4, 5, 10 and 11 a guide roller 26 is also rotatably mounted in brackets 30 and 31. Roller [216] *26* is mounted forward and below of the axis substantially tangential to the channels 14 and 15 and defines one side of a throat to guide curtain 10.

AS A RESULT OF REEXAMINATION, IT HAS BEEN DETERMINED THAT:

The patentability of claims 1-9 is confirmed.

Claims 10 and 11 are determined to be patentable as amended.

Claims 12-14, dependent on an amended claim, are determined to be patentable.

New claims 15-18 are added and determined to be patentable.

10. A damage-minimizing door [including] *comprising:*
a flexible curtain having a first upper end, a second lower end and side edges, *said curtain having a thicker area along substantially the entire length of each side edge thereof;*
a curtain winding mechanism, said first end of said curtain being secured to said curtain winding mechanism for moving said curtain upwards and downwards to respectively open and close a doorway;
a pair of parallel and spaced apart guide channel means each comprising an elongate slot whose mouth faces into said doorway, said side edges being movable upwardly and downwardly in said slot as said curtain is respectively moved up and down, *each guide channel means including, adjacent said slot mouth, restraining means for restraining movement of said curtain laterally out of the guide channel means;*
said side edges sealingly engaging said *guide* channel means when said door is employed in an environment which is at least at atmospheric pressure to normally restrain lateral movement of said side edges through the slot mouth from said guide channel means; and [.]
said side edges of said flexible curtain being pulled laterally through the slot mouth from said guide channel means when a predetermined impact force is applied to said flexible curtain, causing, at the most, negligible damage to said guide channel means and minimal damage to said flexible curtain.

11. A damage-minimizing door [as claimed in claim 10] *comprising:*
*a flexible curtain having a first upper end, a second lower end and side edges;*
*a curtain winding mechanism, said first end of said curtain being secured to said curtain winding mechanism for moving said curtain upwards and downwards to respectively open and close a doorway;*
*a pair of parallel and spaced apart guide channel means each comprising an elongate slot whose mouth faces into said doorway, said side edges being movable upwardly and downwardly in said slot as said curtain is respectively moved up and down;*
*said side edges sealingly engaging said guide channel means when said door is employed in an environment which is at least at atmospheric pressure to normally restrain lateral movement of said side edges through the slot mouth from said guide channel means; and*
*said side edges of said flexible curtain being pulled laterally through the slot mouth from said guide channel means when a predetermined impact force is applied to said flexible curtain, causing at the most, negligible damage to said guide channel means and minimal damage to said flexible curtain;*
wherein said curtain [incudes] *includes* a compressible thicker area along each *side* edge thereof engageable with said guide [channels] *channel means*; said guide [channels] *channel means* including, adjacent said slot mouth, restraining means for restraining movement of said curtain laterally out of said guide channel means.

*15. A damage-minimizing door according to claim 11 wherein said curtain winding mechanism comprises an idling guide roller horizontally mounted adjacent top ends of said guide channel means, said guide roller engaging one side of said curtain and capable of guiding said curtain into the slots of said channel means.*

*16. A damage-minimizing door according to claim 15 wherein said curtain is made of hard rubber.*

*17. A damage-minimizing door according to claim 11 wherein said restraining means forms at least one sloping surface for engaging one side of said thicker area of the curtain, said sloping surface extending inwardly towards the curtain at an acute angle to the plane of the curtain.*

*18. A damage-minimizing door according to claim 17 wherein said thicker area of said curtain has a sloping side surface on a side edge thereof facing said sloping surface of said restraining means.*

* * * * *